(12) United States Patent
Kragel et al.

(10) Patent No.: US 11,880,604 B2
(45) Date of Patent: Jan. 23, 2024

(54) READ FUSED GROUPS WITH UNIFORM RESOURCE ALLOCATION

(71) Applicant: Western Digital Technologies, Inc., San Jose, CA (US)

(72) Inventors: Oleg Kragel, San Jose, CA (US); Vijay Sivasankaran, Dublin, CA (US); Mikhail Palityka, Oakville (CA); Lawrence Vazhapully Jacob, Folsom, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/743,298

(22) Filed: May 12, 2022

(65) Prior Publication Data

US 2023/0367512 A1    Nov. 16, 2023

(51) Int. Cl.
*G06F 3/06* (2006.01)

(52) U.S. Cl.
CPC .......... *G06F 3/0659* (2013.01); *G06F 3/0607* (2013.01); *G06F 3/0658* (2013.01); *G06F 3/0679* (2013.01)

(58) Field of Classification Search
CPC .... G06F 3/0659; G06F 3/0607; G06F 3/0658; G06F 3/0679; G06F 12/0284; G06F 12/0615; G06F 12/0224–0246; G06F 12/08; G06F 12/0646; G06F 3/06
See application file for complete search history.

(56) References Cited

U.S. PATENT DOCUMENTS

| | | | |
|---|---|---|---|
| 7,558,197 B1 | 7/2009 | Sindhu et al. | |
| 8,423,713 B2* | 4/2013 | Hamaguchi | G06F 3/061 |
| | | | 711/173 |
| 9,927,983 B2 | 3/2018 | Benisty et al. | |
| 10,379,742 B2 | 8/2019 | Smith et al. | |
| 10,572,160 B1 | 2/2020 | Farhan et al. | |
| 2002/0091882 A1 | 7/2002 | Espeseth et al. | |
| 2019/0042150 A1 | 2/2019 | Wells et al. | |
| 2020/0089407 A1 | 3/2020 | Baca et al. | |
| 2020/0167274 A1 | 5/2020 | Bahirat et al. | |
| 2020/0356306 A1 | 11/2020 | Subbarao | |
| 2020/0356484 A1 | 11/2020 | Subbarao | |
| 2020/0393974 A1 | 12/2020 | Bahirat | |

(Continued)

FOREIGN PATENT DOCUMENTS

CN    111694515 A    9/2020

*Primary Examiner* — Khoa D Doan
(74) *Attorney, Agent, or Firm* — Michael Best & Friedrich LLP

(57) ABSTRACT

Read Fused Groups with uniform resource allocation. In one example, a data storage device including an electronic processor that, when executing the Uniform Read Fused Group scheme, is configured to receive information indicating each zone of a plurality of Zone Namespace (ZNS) zones is assigned to one of a plurality of Read Fused Groups (RFGs), assign a portion of a plurality of resources of a memory to the plurality of ZNS zones, control all of the plurality of concurrency units to process a first resource of the plurality of resources assigned to a first Read Fused Group (RFG) of the plurality of RFGs. The first resource is assigned to a first zone of the plurality of ZNS zones, the first zone is assigned to the first RFG, and the electronic processor is one of the plurality concurrency units.

20 Claims, 4 Drawing Sheets

(56) References Cited

U.S. PATENT DOCUMENTS

| | | |
|---|---|---|
| 2021/0056023 A1 | 2/2021 | Jin et al. |
| 2021/0132827 A1* | 5/2021 | Helmick ............... G06F 3/0629 |
| 2021/0208800 A1* | 7/2021 | Yang .................... G06F 3/0685 |
| 2022/0027472 A1 | 1/2022 | Golden et al. |
| 2023/0089022 A1* | 3/2023 | Miyamoto ............ G06F 3/0659 |
| | | 711/154 |

* cited by examiner

READ FUSED GROUPS WITH UNIFORM RESOURCE ALLOCATION

FIELD

This application relates generally to data storage devices, and more particularly, to a controller including read fused zone groups with uniform resource allocation.

BACKGROUND

A Read Fused Group (RFG) is a zone property set by a ZNS host and provided to a data storage controller via a ZNS commands set. Zones belonging to the same RFG are stored in a way that minimizes access collision to internal hardware resources inside a data storage controller when all or a subset of zones from the same RFG are concurrently read by the host.

SUMMARY

Resources allocated without awareness of the RFG requirements are subject to a risk of imbalanced utilization of hardware components involved in processing the resources.

One embodiment of the present disclosure includes a data storage device. The data storage device includes a plurality of concurrency units, a memory, and a data storage controller. The data storage controller includes, an electronic processor and a data storage controller memory that includes a Uniform Read Fused Group scheme, the electronic processor, when executing the Uniform Read Fused Group scheme, is configured to receive information indicating each zone of a plurality of Zone Namespace (ZNS) zones is assigned to one of a plurality of Read Fused Groups (RFGs), assign a portion of the plurality of resources to a plurality of ZNS zones, control all of the plurality of concurrency units to process a first resource of the plurality of resources assigned to a first Read Fused Group (RFG) of the plurality of RFGs. The first resource is assigned to a first zone of the plurality of ZNS zones, the first zone is assigned to the first RFG, and the electronic processor is one of the plurality concurrency units.

Another embodiment of the present disclosure includes a method. The method includes receiving, with a data storage controller and a Uniform Read Fused Group scheme, information indicating each zone of a plurality of Zone Namespace (ZNS) zones is assigned to one of a plurality of Read Fused Groups (RFGs). The method includes assigning, with the data storage controller and the Uniform Read Fused Group scheme, a portion of a plurality of resources of a memory to the plurality of ZNS zones. The method also includes controlling, with the data storage controller and the Uniform Read Fused Group scheme, all of a plurality of concurrency units of a data storage device to process a first resource of the plurality of resources assigned to a first Read Fused Group (RFG) of the plurality of RFGs. The first resource is assigned to a first zone of the plurality of ZNS zones, the first zone is assigned to the first RFG, and the electronic processor is one of the plurality concurrency units.

Yet another embodiment of the present disclosure includes an apparatus. The apparatus includes means for receiving information indicating each zone of a plurality of Zone Namespace (ZNS) zones is assigned to one of a plurality of Read Fused Groups (RFGs). The apparatus includes means for assigning a portion of a plurality of resources of a memory to the plurality ZNS zones. The apparatus also includes means for controlling all of a plurality of concurrency units of a data storage device to process a first resource of the plurality of resources assigned to a first Read Fused Group (RFG) of the plurality of RFGs. The first resource is assigned to a first zone of the plurality of ZNS zones, the first zone is assigned to the first RFG, and the electronic processor is one of the plurality concurrency units.

Various aspects of the present disclosure provide for improvements in data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, etc.

Figure 1:
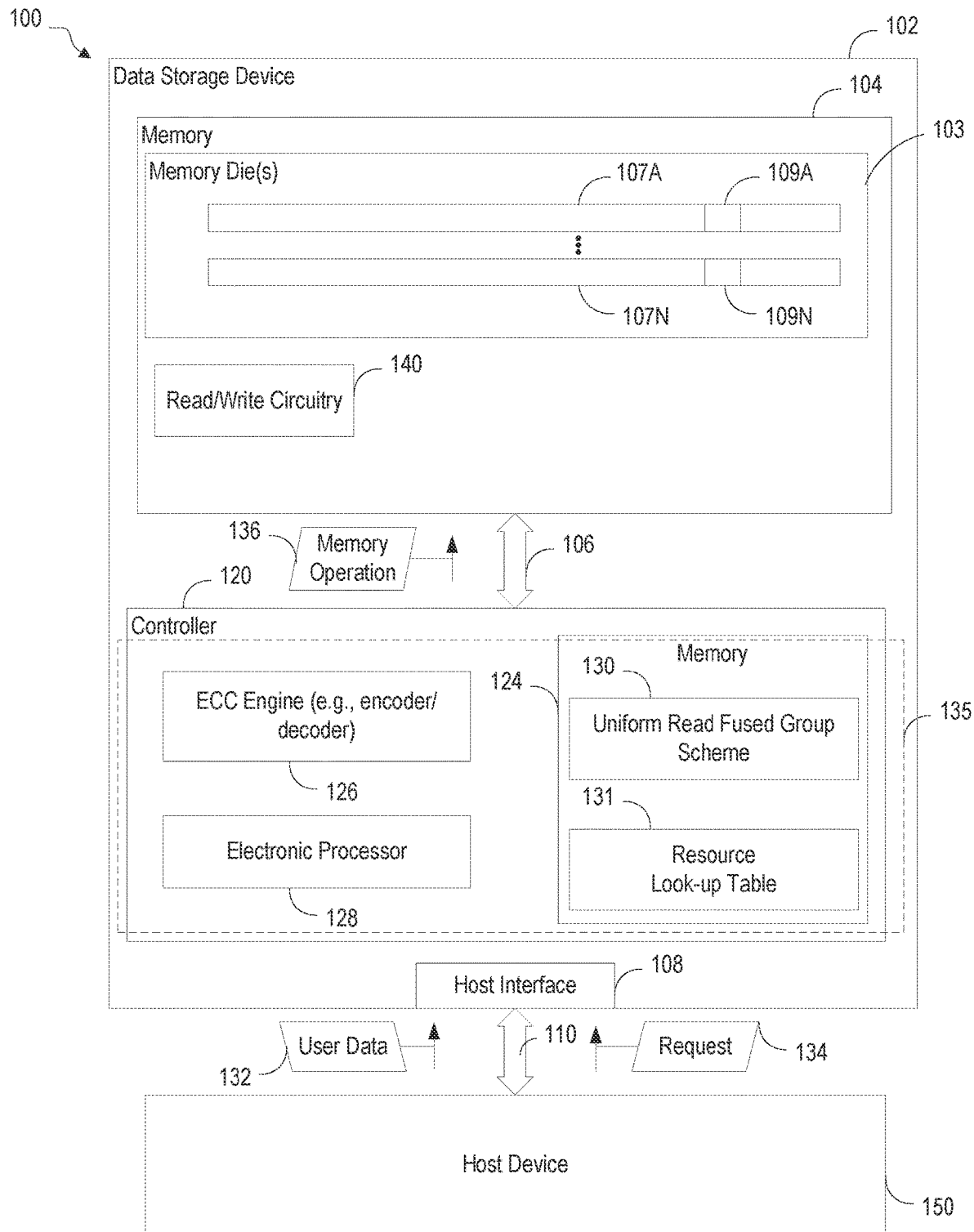
FIG. 1 is block diagram of a system including a data storage device and a host device, in accordance with some embodiments of the disclosure.

FIG. 1 is block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage controller") and a memory 104 (e.g., non-volatile memory) that is coupled to the data storage controller 120.

One example of the structural and functional features provided by the data storage controller 120 are illustrated in FIG. 1 in a simplified form. One skilled in the art would also recognize that the data storage controller 120 may include additional modules or components other than those specifically illustrated in FIG. 1. Additionally, although the data storage device 102 is illustrated in FIG. 1 as including the data storage controller 120, in other implementations, the data storage controller 120 is instead located separate from the data storage device 102. As a result, operations that would normally be performed by the data storage controller 120 described herein may be performed by another device that connects to the data storage device 102.

The data storage device 102 and the host device 150 may be operationally coupled via a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 via the communication path 110, such as a wired communication path and/or a wireless communication path. For example, the data storage device 102 may include an interface 108 (e.g., a host interface) that enables communication via the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as the request 134 to erase data at, read data from, or write data to the memory 104 of the data storage device 102. Additionally, in some examples, the one or more commands may include a set of ZNS commands that provide information regarding the assignment of a plurality of ZNS zones to a plurality of Read Fused Groups (RFGs). Each RFG may include one or more ZNS zones and each ZNS zones may be assigned one or more resources (e.g., one or more flash blocks of the memory 104) by the data storage device 102 (e.g., the data storage controller 102).

The host device 150 may also issue one or more vendor specific commands to the data storage device 102 to notify and/or configure the data storage device 102. For example, the host device 150 may be configured to provide data, such as user data 132 and the request 134, to be stored at the memory 104 or to request data to be read from the memory 104, respectively. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates via a memory interface that enables reading from the memory 104 and writing to the memory 104. In some examples, the host device 150 may operate in compliance with an industry specification, a Secure Digital (SD) Host Controller specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more flash blocks (e.g., one or more erase blocks). Each flash block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies.

The data storage device 102 includes the data storage controller 120 coupled to the memory 104 (e.g., the one or more memory dies 103) via a bus 106, an interface (e.g., interface circuitry), another structure, or a combination thereof. For example, the bus 106 may include multiple distinct channels to enable the data storage controller 120 to communicate with each of the one or more memory dies 103 in parallel with, and independently of, communication with the other memory dies 103. In some implementations, the memory 104 may be a flash memory.

The data storage controller 120 is configured to receive data and instructions from the host device 150 and to send data to the host device 150. For example, the data storage controller 120 may send data to the host device 150 via the interface 108, and the data storage controller 120 may receive data from the host device 150 via the interface 108. The data storage controller 120 is configured to send data and commands (e.g., the memory operation 136) to the memory 104 and to receive data from the memory 104. For example, the data storage controller 120 is configured to send data and a write command to cause the memory 104 to store data to a specified address of the memory 104. The write command may specify a physical address of a portion of the memory 104 (e.g., a physical address of a word line of the memory 104) that is to store the data.

The data storage controller 120 is configured to send a read command to the memory 104 to access data from a specified address of the memory 104. The read command may specify the physical address of a region of the memory 104 (e.g., a physical address of a word line of the memory 104). The data storage controller 120 may also be configured to send data and commands to the memory 104 associated with background scanning operations, garbage collection operations, and/or wear-leveling operations, or other suitable memory operations.

The data storage controller 120 may include a memory 124 (for example, a random access memory ("RAM"), a read-only memory ("ROM"), a non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128. For example, the memory 124 stores a Uniform Read Fused Group scheme 130 and a Resource look-up table 131 as described in greater detail below in FIGS. 3 and 4.

Additionally, although the data storage controller 120 is illustrated in FIG. 1 as including the memory 124, in other implementations, some or all of the memory 124 is instead located separate from the data storage controller 120 and executable by the electronic processor 128 or a different electronic processor that is external to the data storage controller 120 and/or the data storage device 102. For example, the memory 124 may be dynamic random-access memory (DRAM) that is separate and distinct from the data storage controller 120. As a result, operations that would normally be performed solely by the data storage controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage controller 120 and in communication with memory of the data storage device 102, and 4) a different electronic processor that is external to the data storage controller 120 and in communication with memory that is external to the data storage device 102.

The data storage controller 120 may send the memory operation 136 (e.g., a read command) to the memory 104 to cause the read/write circuitry 140 to sense data stored in a storage element. For example, the data storage controller 120 may send the read command to the memory 104 in response to receiving a request for read access from the host device 150.

Practically, internal hardware resources available to the data storage controller 120 are limited and divided between a set of internal components that execute concurrently, referred to and illustrated as Concurrency Units (CUs) 135. Resource division may be multi-level, where internal CUs of an upper layer split into lower level CUs. An example of such resource may be a flash block, and an example of a CU may be the electronic processor 128 or other hardware component of the data storage controller's data-path (e.g. a Flash Interface Module). For example, the CU may be an ASIC or FPGA chip executing a specific algorithm, assuming there is more than one instance of circuitry implementing that algorithm in it available. Also, the CU may be each core in a single core or multi-core CPU.

Figure 2:
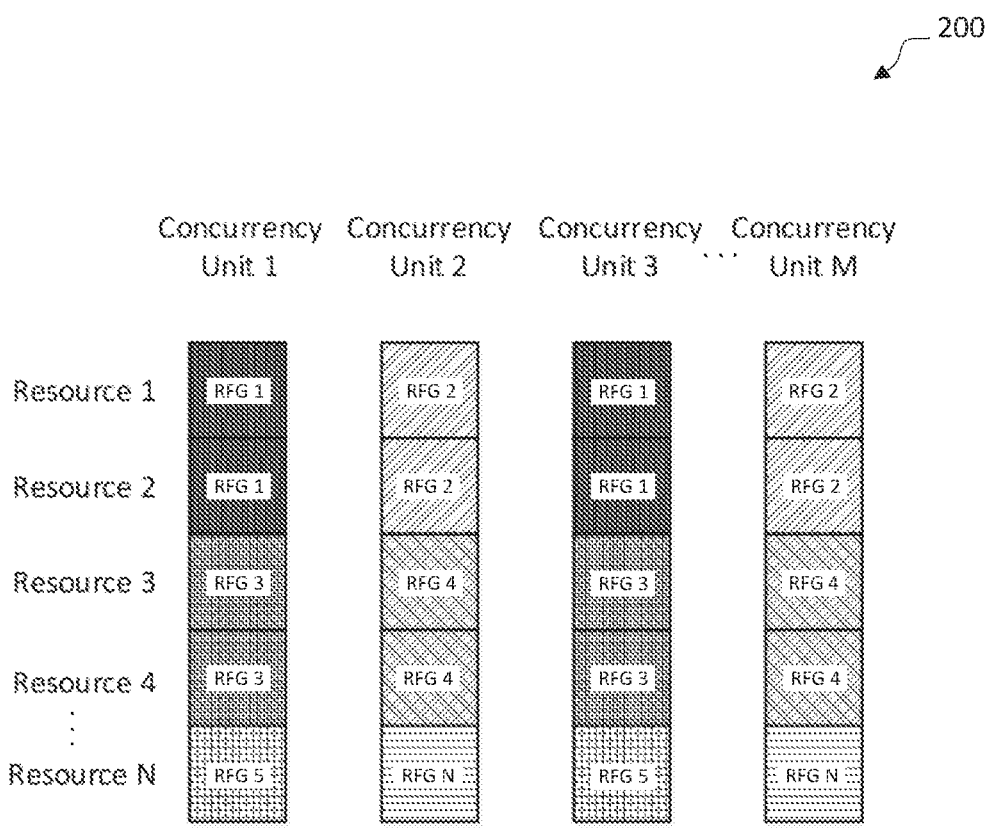
FIG. 2 is a diagram illustrating an example workload including a mixture of Read Fused Zone Groups that suboptimally utilize available hardware concurrency units of the data storage controller of FIG. 1.

Resources (i.e., flash blocks) allocated without awareness of the RFG requirements are subject to a risk of imbalanced utilization of hardware components involved in processing the resources. FIG. 2 is a diagram illustrating an example workload 200 including a mixture of Read Fused Zone Groups (each composed of M unique zones) that suboptimally utilize available hardware concurrency units of the data storage controller 120 of FIG. 1. The sub-optimal utilization is more pronounced at the time when data from all of the zones that are part of the same RFG is being read out by the host 150. The reason why the read path is more pronounced is in the non-proportionally higher read bandwidth that a data storage controller may deliver versus write bandwidth.

As illustrated in FIG. 2, a first resource (Resource 1) and a second resource (Resource 2) with respect to a first concurrency unit Concurrency Unit 1 are part of a first fused read group (RFG 1). Similarly, the first resource and the second resource with respect to a third concurrency unit (Concurrency Unit 3) are part of the first fused read group.

As illustrated in FIG. 2, the first resource and the second resource with respect to a second concurrency unit (Concurrency Unit 2) are part of a second fused read group (RFG 2). Similarly, the first resource and the second resource with respect to an m-th concurrency unit (Concurrency Unit M) (e.g., a fourth concurrency unit) are part of the second fused read group.

As illustrated in FIG. 2, a third resource (Resource 3) and a fourth resource (Resource 4) with respect to the first concurrency unit are part of a third fused read group (RFG 3). Similarly, the third resource and the fourth resource with respect to the third concurrency unit are part of the third fused read group.

As illustrated in FIG. 2, the third resource and the fourth resource with respect to the second concurrency unit are part of a fourth fused read group (RFG 4). Similarly, the first resource and the second resource with respect to the m-th concurrency unit are part of the fourth fused read group.

Lastly, as illustrated in FIG. 2, the n-th resource (Resource N) (e.g., the fifth resource) with respect to the first concurrency unit and the third concurrency unit is part of a fifth read fused group (RFG 5). The n-th resource with respect to the second concurrency unit and the m-th concurrency unit is part of an n-th fused read group (RFG N).

In view of the foregoing, the first concurrency unit and the third concurrency unit are each processing resources with respect to the first read fused group, the third read fused group, and the fifth read fused group (i.e., odd read fused groups). In parallel, the second concurrency unit and the m-th concurrency unit are each processing resources with respect to the second read fused group, the fourth read fused group, and the n-th read fused group (i.e., even read fused groups).

However, a mixed read fused groups processing by the concurrency units limits the read bandwidth delivered to the host 150. In the example of FIG. 2, the even/odd read fused groups processing limits the bandwidth delivered to the host 150.

Figure 3:
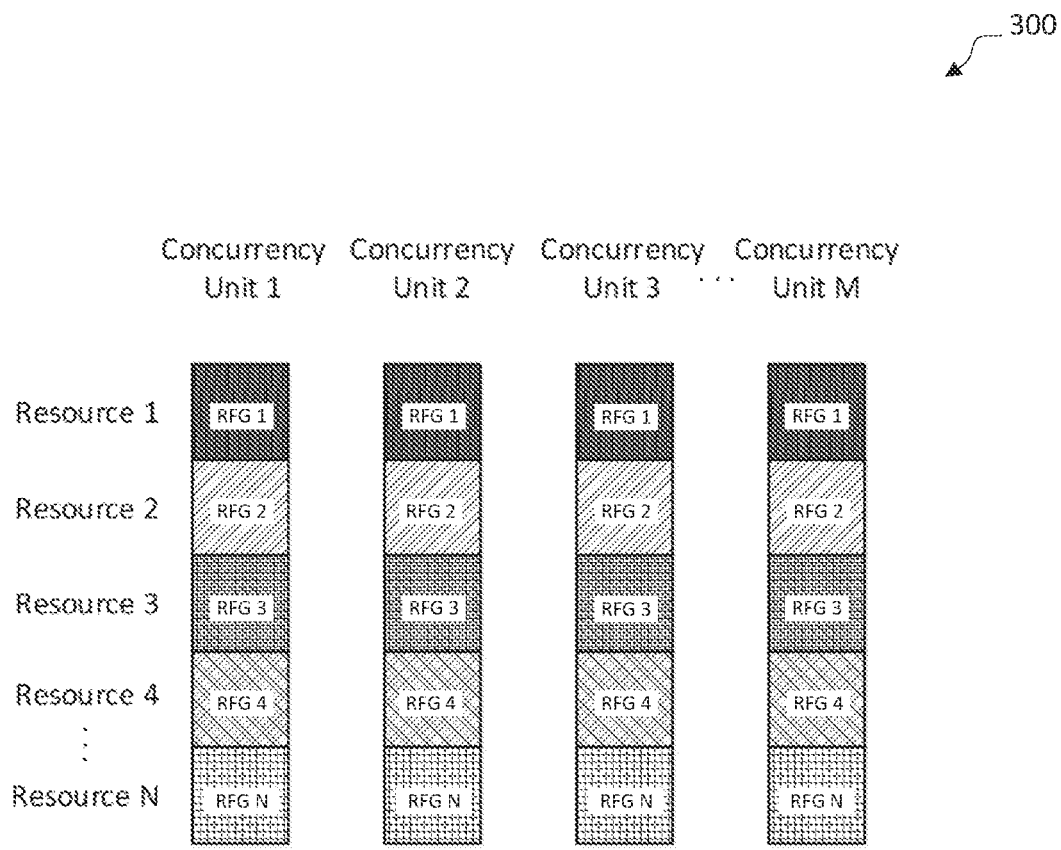
FIG. 3 is a diagram illustrating an example workload including a uniformity of Read Fused Zone Groups that optimally utilize available hardware concurrency units of the data storage controller of FIG. 1, in accordance with various aspects of the present disclosure.

FIG. 3 is a diagram illustrating an example workload 300 including a uniformity of Read Fused Zone Groups (each composed of M unique zones, and each of the M unique zones composed of M resources) that optimally utilize available hardware concurrency units of the data storage controller 120 of FIG. 1, in accordance with various aspects of the present disclosure. As illustrated in FIG. 3, there is a one-to-one mapping between the unique zones and the resources, although one unique zone may span over multiple resources. Additionally, more than one unique zone may span over one resource, however, this case is impractical. FIG. 3 is described with respect to FIG. 1.

As illustrated in FIG. 3, a first resource (Resource 1) with respect to a first concurrency unit (Concurrency Unit 1), a second concurrency unit (Concurrency Unit 2), a third concurrency unit (Concurrency Unit 3), and an m-th concurrency unit (Concurrency Unit M) (e.g., the fourth concurrency unit) are part of a first fused read group (RFG 1).

A second resource (Resource 2) with respect to the first concurrency unit, the second concurrency unit, the third concurrency unit, and the m-th concurrency unit are part of a second fused read group (RFG 2). A third resource (Resource 3) with respect to the first concurrency unit, the second concurrency unit, the third concurrency unit, and the m-th concurrency unit are part of a third fused read group (RFG 3). A fourth resource (Resource 4) with respect to the first concurrency unit, the second concurrency unit, the third concurrency unit, and the m-th concurrency unit are part of a fourth fused read group (RFG 4). Lastly, an n-th resource (Resource N) (e.g., the fifth resource) with respect to the first concurrency unit, the second concurrency unit, the third concurrency unit, and the m-th concurrency unit are part of an n-th fused read group (RFG N) (e.g., the fifth resource).

A uniform read fused groups processing by the concurrency units increases the read bandwidth delivered to the host 150 because whenever the host 150 decides to issue read commands to a set of zones from the same RFG, the data storage controller 120 is now able to utilize some or all concurrency units available to it to process the same RFG. In the example of FIG. 3, the single resource of the single read fused group processed concurrently by each concurrency unit increases the read bandwidth delivered to the host 150 by the data storage device 102.

However, in other examples, more than one resource of the single read fused group processed concurrently by each concurrency unit also increases the read bandwidth delivered to the host 150 by the data storage device 102. In other words, the workload 300 uniformly processes RFGs that may include varying amounts of resources.

Figure 4:
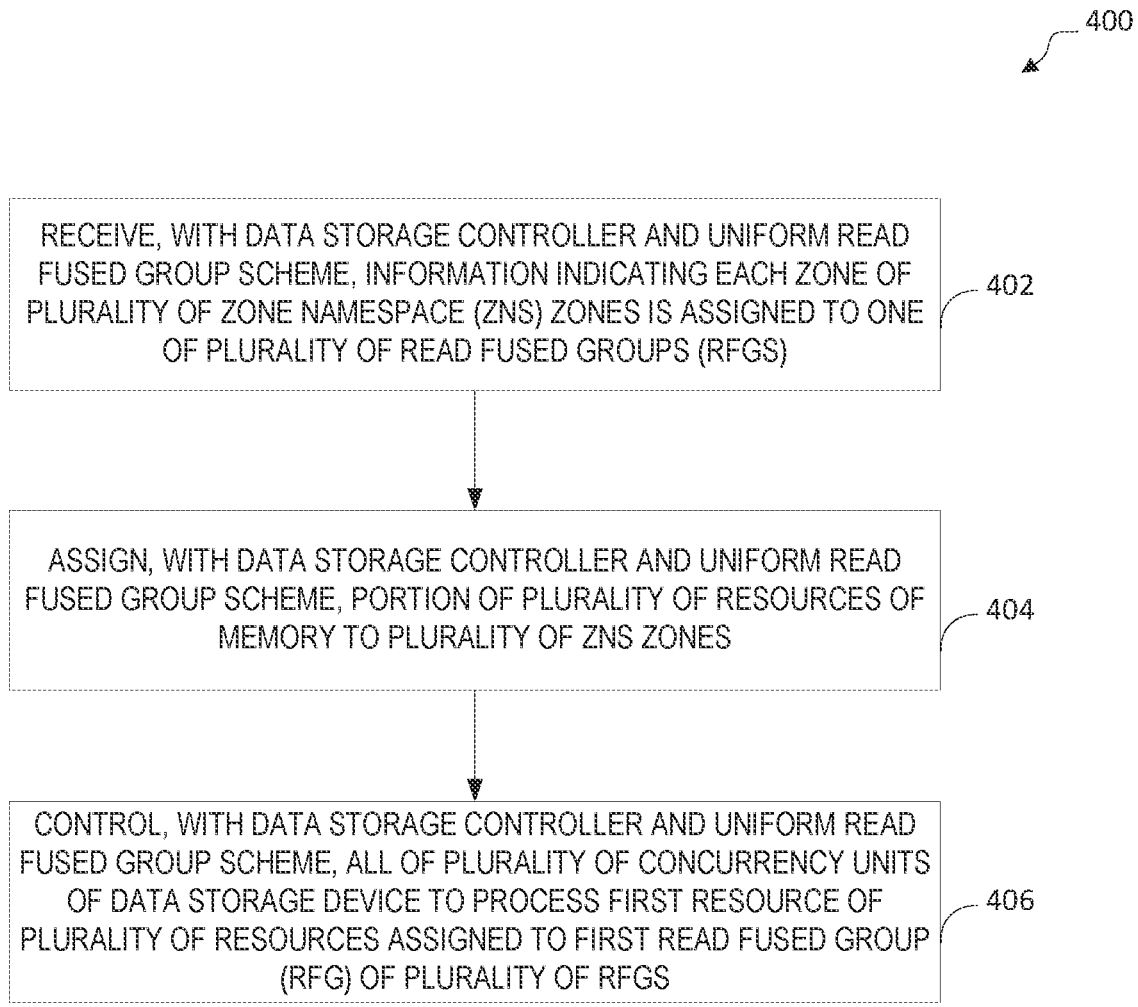
FIG. 4 is a flowchart illustrating an example of a Uniform Read Fused Group process 400, in accordance with various aspects of the present disclosure.

FIG. 4 is a flowchart illustrating an example of a Uniform Read Fused Group process 400, in accordance with various aspects of the present disclosure. FIG. 4 is described with respect to FIGS. 1 and 3.

The method 400 includes receiving, with a data storage controller and a Uniform Read Fused Group scheme, information indicating each zone of a plurality of Zone Namespace (ZNS) zones is assigned to one of a plurality of Read Fused Groups (RFGs) (at block 402). For example, the data storage controller 120, with the Uniform Read Fused Group scheme 130, receives a zone property set by a ZNS host (e.g., the host 150) via a ZNS commands set.

The method 400 includes assigning, with the data storage controller and the Uniform Read Fused Group scheme, a portion of the plurality of resources of a memory to a plurality of Zone Namespace (ZNS) zones (at block 404). For example, the data storage controller 120, with the Uniform Read Fused Group scheme 130, assigns the first resource through the n-th resource of the memory 104 to a first zone through an n-th zone, respectively. In some examples, the first zone through the n-th zone may be assigned one resource. In other examples, the first zone through the n-th zone may be assigned more than one resource.

In yet other examples, the first zone through the n-th zone may be assigned varying amounts of resources. In these examples, the varying amounts of resources may be based on information received from the host 150.

The method 400 also includes controlling, with the data storage controller and the Uniform Read Fused Group scheme, all of a plurality of concurrency units of a data storage device to process a first resource of the plurality of resources assigned to a first Read Fused Group (RFG) of the plurality of RFGs (at block 406). For example, the data storage controller 120 controls the first concurrency unit through the m-th concurrency unit (e.g., the concurrency units 135 of FIG. 1) to process the first RFG (e.g., all resources assigned to the first RFG including the first resource). In some examples, the use of "all" may refer to all managed CUs, where some of the plurality of concurrency units may be unmanaged.

Further, in the example of FIG. 4, the first resource is assigned to the first zone of the plurality of ZNS zones, the first zone is assigned to the first RFG, and the electronic processor is one of the plurality concurrency units. As described herein, controller and electronic processor include firmware code that, when executed, controls which flash interface modules (FIMs) need to be activated based on flash block address (the resource following the terminology) being processed. In other words, with one CPU and multiple FIMs, the goal of the RFG management/writing algorithm is to utilize resources with minimal overlap on available CUs.

In some examples, in the method 400, assigning the portion of the plurality of resources to the plurality of Zone Namespace (ZNS) zones further includes the data storage controller 120 storing the portion of the plurality of resources that are assigned to the plurality of Zone Namespace (ZNS) zones in a look-up table (e.g., the Resource look-up table 131).

In some examples, in the method 400, controlling the all of the plurality of concurrency units to process the first resource of the plurality of resources assigned to the first RFG of the plurality of RFGs further includes the data storage controller 120 controlling the all of the plurality of concurrency units to process the first resource of the plurality of resources assigned to the RFG of the plurality of RFGs based on the look-up table (e.g., the Resource look-up table 131).

In some examples, the method 400 may further include controlling all of the plurality of concurrency units to process a second resource of the plurality of resources assigned to a second Read Fused Group of the plurality of RFGs. In these examples, the second resource is assigned to a second zone and second zone is assigned to the second RFG.

In some examples, the method 400 may further include controlling the all of the plurality of concurrency units to process an n-th resource of the plurality of resources assigned to an n-th Read Fused Group of the plurality of RFGs. In these examples, the n-th resource is assigned to an n-th zone and the n-th zone is assigned to the n-th RFG. Further, in other examples, the portion of the plurality of resources is all of the plurality of resources, and the n-th resource is a last resource of all of the plurality of resources.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device comprising:
a plurality of concurrency units;
a memory including a plurality of resources; and
a data storage controller including an electronic processor and a data storage controller memory that includes a Uniform Read Fused Group scheme, the electronic processor, when executing the Uniform Read Fused Group scheme, is configured to:
receive information indicating each zone of a plurality of Zone Namespace (ZNS) zones is assigned to one of a plurality of Read Fused Groups (RFGs),
assign a portion of the plurality of resources to a plurality of ZNS zones,
control all of the plurality of concurrency units to process a first resource of the plurality of resources assigned to a first Read Fused Group (RFG) of the plurality of RFGs,
wherein the first resource is assigned to a first zone of the plurality of ZNS zones,
wherein the first zone is assigned to the first RFG, and
wherein the electronic processor is one of the plurality of concurrency units.

2. The data storage device of claim 1, wherein the information is a ZNS command set from a host device.

3. The data storage device of claim 1, wherein, to assign the portion of the plurality of resources to the plurality of Zone Namespace (ZNS) zones, the electronic processor is further configured to store the portion of the plurality of resources that are assigned to the plurality of Zone Namespace (ZNS) zones in a look-up table.

4. The data storage device of claim 3, wherein, to control the all of the plurality of concurrency units to process the first resource of the plurality of resources assigned to the first RFG of the plurality of RFGs, the electronic processor is further configured to control all of the plurality of concurrency units to process the first resource of the plurality of resources assigned to the RFG of the plurality of RFGs based on the look-up table.

5. The data storage device of claim 1, wherein the electronic processor is further configured to:
control the all of the plurality of concurrency units to process a second resource of the plurality of resources assigned to a second Read Fused Group of the plurality of RFGs,
wherein the second resource is assigned to a second zone of the plurality of ZNS zones, and
wherein the second zone is assigned to the second RFG.

6. The data storage device of claim 5, wherein the electronic processor is further configured to:
control the all of the plurality of concurrency units to process an n-th resource of the plurality of resources assigned to an n-th Read Fused Group of the plurality of RFGs,
wherein the n-th resource is assigned to an n-th zone of the plurality of ZNS zones, and
wherein the n-th zone is assigned to the n-th RFG.

7. The data storage device of claim 6, wherein the portion of the plurality of resources is all of the plurality of resources, and wherein the n-th resource is a last resource of the all of the plurality of resources.

8. A method comprising:
receiving, with a data storage controller and a Uniform Read Fused Group scheme, information indicating each zone of a plurality of Zone Namespace (ZNS) zones is assigned to one of a plurality of Read Fused Groups (RFGs);
assigning, with the data storage controller and the Uniform Read Fused Group scheme, a portion of a plurality of resources of a memory to the plurality of ZNS zones; and
controlling, with the data storage controller and the Uniform Read Fused Group scheme, all of a plurality of concurrency units of a data storage device to process a first resource of the plurality of resources assigned to a first Read Fused Group (RFG) of the plurality of RFGs,
wherein the first resource is assigned to a first zone of the plurality of ZNS zones, and
wherein the first zone is assigned to the first RFG.

9. The method of claim 8, wherein the information is a ZNS command set from a host device.

10. The method of claim 8, wherein assigning the portion of the plurality of resources to the plurality of Zone Namespace (ZNS) zones further includes storing the portion of the plurality of resources that are assigned to the plurality of Zone Namespace (ZNS) zones in a look-up table.

11. The method of claim 10, wherein controlling the all of the plurality of concurrency units to process the first resource of the plurality of resources assigned to the first RFG of the plurality of RFGs further includes controlling the all of the plurality of concurrency units to process the first resource of the plurality of resources assigned to the RFG of the plurality of RFGs based on the look-up table.

12. The method of claim 8, further comprising:
controlling the all of the plurality of concurrency units to process a second resource of the plurality of resources assigned to a second Read Fused Group of the plurality of RFGs,
wherein the second resource is assigned to a second zone of the plurality of ZNS zones, and
wherein the second zone is assigned to the second RFG.

13. The method of claim 12, further comprising:
controlling the all of the plurality of concurrency units to process an n-th resource of the plurality of resources assigned to an n-th Read Fused Group of the plurality of RFGs,
wherein the n-th resource is assigned to an n-th zone of the plurality of ZNS zones, and
wherein the n-th zone is assigned to the n-th RFG.

14. The method of claim 13, wherein the portion of the plurality of resources is all of the plurality of resources, and wherein the n-th resource is a last resource of the all of the plurality of resources.

15. An apparatus comprising:
means for receiving information indicating each zone of a plurality of Zone Namespace (ZNS) zones is assigned to one of a plurality of Read Fused Groups (RFGs);
means for assigning a portion of a plurality of resources of a memory to the plurality ZNS zones;
means for controlling all of a plurality of concurrency units of a data storage device to process a first resource of the plurality of resources assigned to a first Read Fused Group (RFG) of the plurality of RFGs,
wherein the first resource is assigned to a first zone of the plurality of ZNS zones, and
wherein the first zone is assigned to the first RFG.

16. The apparatus of claim 15, wherein the information is a ZNS command set from a host device.

17. The apparatus of claim 15, wherein the means for assigning the portion of the plurality of resources to the plurality of Zone Namespace (ZNS) zones further includes means for storing the portion of the plurality of resources that are assigned to the plurality of Zone Namespace (ZNS) zones in a look-up table.

18. The apparatus of claim 17, wherein the means for controlling the all of the plurality of concurrency units to process the first resource of the plurality of resources assigned to the first RFG of the plurality of RFGs further includes means for controlling the all of the plurality of concurrency units to process the first resource of the plurality of resources assigned to the RFG of the plurality of RFGs based on the look-up table.

19. The apparatus of claim 15, further comprising:
means for controlling the all of the plurality of concurrency units to process a second resource of the plurality of resources assigned to a second Read Fused Group of the plurality of RFGs,
wherein the second resource is assigned to a second zone of the plurality of ZNS zones, and
wherein the second zone is assigned to the second RFG.

20. The apparatus of claim 19, further comprising:
means for controlling the all of the plurality of concurrency units to process an n-th resource of the plurality of resources assigned to an n-th Read Fused Group of the plurality of RFGs,
wherein the n-th resource is assigned to an n-th zone of the plurality of ZNS zones, and
wherein the n-th zone is assigned to the n-th RFG.

* * * * *